United States Patent
Ryu et al.

(10) Patent No.: US 12,486,490 B2
(45) Date of Patent: Dec. 2, 2025

(54) **MICROORGANISM OF *CORYNEBACTERIUM* GENUS HAVING ENHANCED L-ARGININE OR L-CITRULLINE PRODUCTIVITY AND A METHOD FOR PRODUCING L-ARGININE OR L-CITRULLINE USING THE SAME**

(71) Applicant: DAESANG CORPORATION, Seoul (KR)

(72) Inventors: Mi Ryu, Gyeonggi-do (KR); Sun Jun Yoon, Gyeonggi-do (KR); In Pyo Hong, Gyeonggi-do (KR); Seok Hyun Park, Gyeonggi-do (KR)

(73) Assignee: DAESANG CORPORATION, Seoul (KR)

( * ) Notice: Subject to any disclaimer, the term of this patent is extended or adjusted under 35 U.S.C. 154(b) by 350 days.

(21) Appl. No.: 17/937,833

(22) Filed: Oct. 4, 2022

(65) Prior Publication Data
US 2024/0026283 A1    Jan. 25, 2024

(30) Foreign Application Priority Data
Jul. 21, 2022 (KR) .................. 10-2022-0090641

(51) Int. Cl.
*C12N 1/20* (2006.01)
*C12R 1/15* (2006.01)

(52) U.S. Cl.
CPC .......... *C12N 1/205* (2021.05); *C12R 2001/15* (2021.05)

(58) Field of Classification Search
CPC ...... C12N 1/205; C12N 9/1096; C12N 15/77; C12N 1/20; C12R 2001/15; C12Y 206/01011; C12Y 206/01013; C12P 13/10
See application file for complete search history.

(56) References Cited

U.S. PATENT DOCUMENTS 8,048,648 B2 * 11/2011 Kim .................. C12P 13/10
                                                 435/114

FOREIGN PATENT DOCUMENTS

| CN | 113736719 | 12/2021 |
|----|-----------|---------|
| EP | 2 650 357 | 10/2013 |
| JP | 2017-79705 | 5/2017 |
| JP | 2020-523989 | 8/2020 |
| KP | 10-2004-0073176 | 8/2004 |
| KR | 10-2008-0006799 | 1/2008 |
| KR | 10-0830290 | 5/2008 |
| KR | 10-2018-0136613 | 12/2018 |
| KR | 10-2269637 | 6/2021 |
| WO | 2008/088148 | 7/2008 |
| WO | 2022/008280 | 1/2022 |

OTHER PUBLICATIONS

Ikeda M, Mitsuhashi S, Tanaka K, Hayashi M. Reengineering of a Corynebacterium glutamicum L-arginine and L-citrulline producer. Applied and environmental microbiology. Mar. 15, 2009;75(6):1635-41. (Year: 2009).*

Rajaram V, Ratna Prasuna P, Savithri HS, Murthy MR. Structure of biosynthetic Naacetylornithine aminotransferase from *Salmonella typhimurium*: Studies on substrate specificity and inhibitor binding. Proteins: Structure, Function, and Bioinformatics. Feb. 1, 2008;70(2):429-41. (Year: 2008).*

Notice of Reasons for Refusal issued Aug. 28, 2023 in corresponding Japanese Patent Application No. 2022-162571, with English language translation.

Park et al., "Metabolic engineering of *Corynebacterium glutamicum* for $_L$-arginine production", Nature communications, Aug. 2014, vol. 5, Article No. 4618, pp. 1-9.

Extended European Search Report issued May 22, 2023 in European Application No. 22200149.7.

Office Action issued Sep. 5, 2024 in Korean Patent Application No. 10-2022-0090641, with English-language Translation.

* cited by examiner

*Primary Examiner* — Sharmila G Landau
*Assistant Examiner* — Emily F Eix
(74) *Attorney, Agent, or Firm* — Wenderoth, Lind & Ponack, L.L.P.

(57) ABSTRACT

The present disclosure relates to a *Corynebacterium* sp. mutant strain having increased L-arginine or L-citrulline productivity and a method of producing L-arginine or L-citrulline using the same. The *Corynebacterium* sp. mutant strain has enhanced activity of acetylornithine aminotransferase involved in the L-arginine biosynthesis pathway, and thus is capable of producing L-arginine or L-citrulline productivity in an increased yield compared to a parent strain.

3 Claims, 1 Drawing Sheet
Specification includes a Sequence Listing.

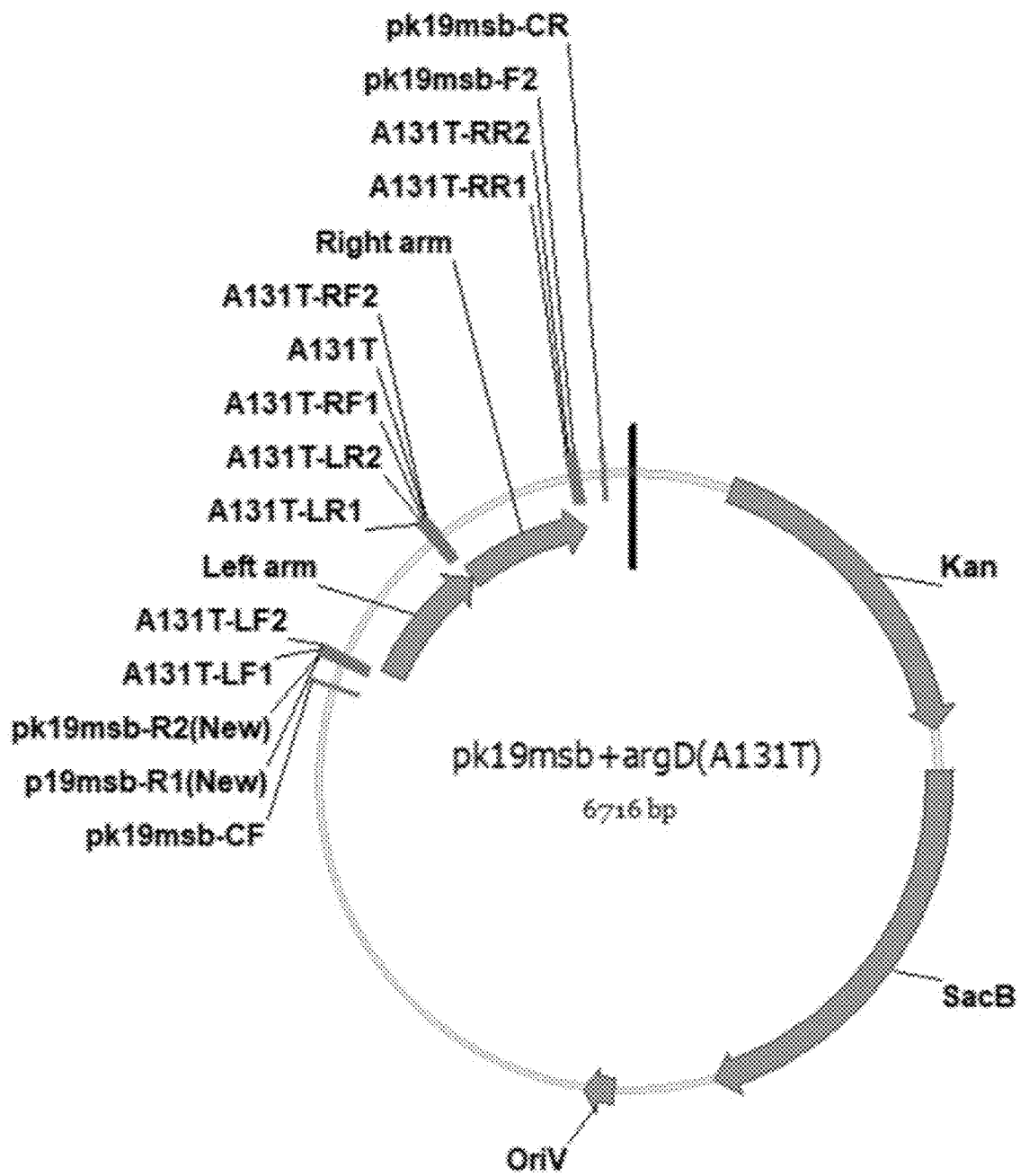

MICROORGANISM OF *CORYNEBACTERIUM* GENUS HAVING ENHANCED L-ARGININE OR L-CITRULLINE PRODUCTIVITY AND A METHOD FOR PRODUCING L-ARGININE OR L-CITRULLINE USING THE SAME

SEQUENCE LISTING

A sequence listing in electronic (XML file) format is filed with this application and incorporated herein by reference. The name of the ASCII text file is "AttachG_Sequencelist_1900.XML"; the file was created on Oct. 3, 2022; the size of the file is 14,588 bytes.

BACKGROUND

1. Technical Field

The present disclosure relates to a *Corynebacterium* sp. microorganism having increased L-arginine or L-citrulline productivity and a method of producing L-arginine or L-citrulline using the same.

2. Related Art

Arginine is known to be contained in plants and the like in a free state. Arginine is one of the non-essential amino acids, but in growing children and special conditions such as stress, trauma, and cancer, it is considered a semi-essential amino acid that should be necessarily supplied, and is widely used as a component for amino acid supplements, pharmaceuticals, foods, and the like. For medicine, arginine is used in liver function promoters, brain function promoters, male infertility treatment agents, comprehensive amino acid preparations, and the like, and for food, arginine is used as a fish cake additive, a health drink additive, and a salt substitute for hypertensive patients.

Citrulline is one of the non-essential amino acids, and it is known that citrulline has useful effects such as promoting ammonia metabolism, improving blood flow by vasodilation, lowering blood pressure, neurotransmission, enhancing immunity, and scavenging reactive oxygen species. In the kidney, citrulline is metabolized to arginine, from which nitric oxide (NO) is produced. That is, citrulline is not an amino acid constituting a protein in vivo, but is one of the intermediates of the urea cycle, and is produced from arginine together with NO, which is known as a substance having a vasodilatory action. In addition, citrulline is condensed with aspartic acid and regenerated into arginine.

The production of such arginine and citrulline may be performed using a naturally occurring wild-type strain or a mutant strain modified from the wild-type strain so as to have increased arginine or citrulline productivity. Recently, in order to increase the efficiency of production of arginine or citrulline, genetic recombination technology has been used for microorganisms such as *Escherichia coli* and *Corynebacterium*. In biosynthesis of L-arginine in microorganisms, L-glutamate is used as a starting material and converted sequentially into N-acetylglutamate, N-acetylglutamyl-P, N-acetylglutamate 5-semialdehyde, N-acetylornithine, L-ornithine, L-citrulline, and argininosuccinate, thereby synthesizing L-arginine. Various proteins such as enzymes, transcription factors, and transport proteins are involved in this stepwise synthesis process. Therefore, it is possible to increase L-arginine or L-citrulline productivity by regulating the activities of various proteins, which are involved in the biosynthesis of L-arginine or L-citrulline, through genetic recombination technology, and many studies have been required to develop a recombinant strain or mutant strain having excellent L-arginine or L-citrulline productivity.

PRIOR ART DOCUMENTS

Patent Documents

Korean Patent No. 10-2269637

SUMMARY

An object of the present disclosure is to provide a *Corynebacterium* sp. mutant strain having increased L-arginine or L-citrulline productivity.

Another object of the present disclosure is to provide a method of producing L-arginine or L-citrulline using the mutant strain.

One aspect of the present disclosure provides a *Corynebacterium* sp. mutant strain having increased L-arginine or L-citrulline productivity by having enhanced activity of acetylornithine aminotransferase.

As used in the present disclosure, "acetylornithine aminotransferase" serves to catalyze a reaction that converts N-acetylglutamate 5-semialdehyde into N-acetylornithine in the L-arginine biosynthesis pathway. The N-acetylornithine is sequentially converted into other substances by various enzymes, and as a result, is synthesized into L-arginine or L-citrulline.

According to one embodiment of the present disclosure, the acetylornithine aminotransferase may be derived from a *Corynebacterium* sp. microorganism.

More specifically, the *Corynebacterium* sp. microorganism may be *Corynebacterium glutamicum*, *Corynebacterium crudilactis*, *Corynebacterium deserti*, *Corynebacterium callunae*, *Corynebacterium suranareeae*, *Corynebacterium lubricantis*, *Corynebacterium doosanense*, *Corynebacterium efficiens*, *Corynebacterium uterequi*, *Corynebacterium stationis*, *Corynebacterium pacaense*, *Corynebacterium singulare*, *Corynebacterium humireducens*, *Corynebacterium marinum*, *Corynebacterium halotolerans*, *Corynebacterium spheniscorum*, *Corynebacterium freiburgense*, *Corynebacterium striatum*, *Corynebacterium canis*, *Corynebacterium ammoniagenes*, *Corynebacterium renale*, *Corynebacterium pollutisoli*, *Corynebacterium imitans*, *Corynebacterium caspium*, *Corynebacterium testudinoris*, *Corynebacaterium pseudopelargi*, or *Corynebacterium flavescens*, without being limited thereto.

As used herein, the term "enhanced activity" means that expression of genes encoding proteins of interest, such as enzymes, transcription factors and transport proteins, has been newly introduced or has been increased so that the expression levels of the proteins have increased compared to those in a wild-type strain or a strain before modification. The term "enhanced activity" also includes: a case in which the activity of the proteins themselves has increased compared to the activity of the proteins, originally possessed by the microorganism, through substitutions, insertions, deletions or combinations thereof, of one or more nucleotides in nucleotide sequences encoding the genes; a case in which the overall activity of the enzymes in the cell is higher than that in the wild-type strain or the strain before modification due to increased expression or translation of the genes encoding the enzymes; and a combination thereof.

According to one embodiment of the present disclosure, enhancement of the activity of the acetylornithine aminotransferase may be achieved by site-directed mutation in a gene encoding the acetylornithine aminotransferase.

According to one embodiment of the present disclosure, the gene encoding acetylornithine aminotransferase may be represented by the nucleotide sequence of SEQ ID NO: 1 or may consist of the amino acid sequence of SEQ ID NO: 2.

According to one embodiment of the present disclosure, the site-directed mutation may be a substitution of one or more nucleotides in the nucleotide sequence of SEQ ID NO: 1.

According to one embodiment of the present disclosure, the site-directed mutation may be a substitution of one or more amino acids in the amino acid sequence of SEQ ID NO: 2.

More specifically, the site-directed mutation may be a consecutive or non-consecutive substitution of one, two, three, four, or five amino acids at positions 50 to 200 or 100 to 150 in the amino acid sequence of SEQ ID NO: 2.

According to one embodiment of the present disclosure, the site-directed mutation may be a substitution of threonine for alanine at amino acid position 131 in the amino acid sequence of SEQ ID NO: 2.

As used herein, the term "increased productivity" means that L-arginine or L-citrulline productivity has increased compared to that in the parent strain. As used herein, the term "parent strain" refers to a wild-type strain or mutant strain to be mutated, and includes a strain that is to be mutated directly or to be transformed with a recombinant vector or the like. In the present disclosure, the parent strain may be a wild-type *Corynebacterium* sp. microorganism or a microorganism or strain mutated from the wild-type microorganism.

As described above, the *Corynebacterium* sp. mutant strain having increased L-arginine or L-citrulline productivity according the present disclosure contains the mutated nucleotide sequence or amino acid sequence of the gene encoding acetylornithine aminotransferase, and thus exhibits increased L-arginine or L-citrulline productivity compared to the parent strain. In particular, the L-arginine or L-citrulline productivity of the *Corynebacterium* sp. mutant strain may be at least 5%, specifically 5 to 80%, 10 to 70%, 20 to 60%, or 30 to 50% higher than that of the parent strain.

According to one embodiment of the present disclosure, the *Corynebacterium* sp. mutant strain may be *Corynebacterium glutamicum*.

The *Corynebacterium* sp. mutant strain according to one embodiment of the present disclosure may be obtained through a recombinant vector containing a variant having a substitution of a portion of the sequence of acetylornithine aminotransferase in the parent strain.

As used herein, the term "portion" means not all of the nucleotide sequence, the polynucleotide sequence, or the amino acid sequence, and may be 1 to 300, preferably 1 to 100, more preferably 1 to 50, without being limited thereto.

As used herein, the term "variant" refers to a polypeptide that differs from the amino acid sequence of a protein encoding a specific gene before mutation due to conservative substitutions, deletions, modifications or additions of one or more amino acids at the N-terminus, C-terminus of and/or within the amino acid sequence, but retains functions or properties of the protein. As used herein, the term "conservative substitution" means replacing one amino acid with another amino acid having similar structural and/or chemical properties. The conservative substitution may have little or no impact on the activity of the resulting protein or polypeptide. In addition, the variant includes those in which one or more portions, such as an N-terminal leader sequence or transmembrane domain, have been removed. Furthermore, the variant includes those in which a portion has been removed from the N- and/or C-terminus of a mature protein. The ability of the variant may be increased, unchanged, or reduced compared to that of the polypeptide before mutation. In the present disclosure, the term "variant" may be used interchangeably with terms such as mutant, modification, variant polypeptide, modified protein, mutation, and the like.

According to one embodiment of the present disclosure, the acetylornithine aminotransferase variant may have the amino acid sequence of SEQ ID NO: 4.

As used herein, the term "vector" means an expression vector capable of expressing a protein of interest in an appropriate host cell, and refers to a gene construct comprising essential regulatory elements that are operably linked to a transgene so that the transgene is expressed. As used herein, the term "operably linked" means that a gene to be expressed is functionally linked to regulatory sequences therefor in a manner that allows for expression of the gene. "Regulatory elements" include a promoter for effecting transcription, an optional operator sequence for regulating transcription, a sequence encoding suitable mRNA ribosome binding sites, and sequences which control termination of transcription and translation. Examples of the vector include, but are not limited to, a plasmid vector, a cosmid vector, a bacteriophage vector, a viral vector, and the like. Example of the phage vector or cosmid vector that may be used include pWE15, M13, λEMBL3, λEMBL4, λFIXII, λDASHII, λZAPII, λgt10, λgt11, Charon4A, and Charon21A, and examples of the plasmid vector that may be used include a pDZ vector, and pBR-based, pUC-based, pBluescriptll-based, pGEM-based, pTZ-based, pCL-based and pET-based vectors. A vector that may be used is not particularly limited, and any known expression vector may be used without limitation.

After the "recombinant vector" used in the present disclosure is transformed into a suitable host cell, it may optionally replicate and function independently of the host genome, or in some cases may be integrated into the genome itself. In this case, the "suitable host cell" is one in which the vector is replicable, and may include an origin of replication, which is a specific nucleotide sequence from which replication begins.

The transformation may be performed using a suitable vector introduction technique selected depending on the host cell, and the gene of interest may be expressed in the host cell. For example, vector introduction may be performed by electroporation, heat shock, calcium phosphate (CaPO$_4$) precipitation, calcium chloride (CaCl$_2$)) precipitation, microinjection, polyethylene glycol (PEG) method, DEAE-dextran method, cationic liposome method, lithium acetate-DMSO method, or combinations thereof. The transformed gene may include any gene, regardless of whether the gene is inserted into the chromosome of the host cell or located outside of the chromosome, as long as the gene may be expressed in the host cell.

The host cell includes a cell transfected, transformed, or infected with the recombinant vector or polynucleotide of the present disclosure in vivo or in vitro. The host cell including the recombinant vector of the present disclosure is a recombinant host cell, a recombinant cell, or a recombinant microorganism.

In addition, the recombinant vector according to the present disclosure may contain a selection marker. The selection marker is used to select transformants (host cells) transformed with the vector. Since only cells expressing the selection marker can survive in a medium treated with the selection marker, it is possible to select the transformed cells. Representative examples of the selection marker include, but are not limited to, kanamycin, streptomycin, chloramphenicol, and the like.

Genes inserted into the recombinant vector for transformation according to the present disclosure may be integrated into a host cell such as a *Corynebacterium* sp. microorganism by homologous recombination crossover.

According to one embodiment of the present disclosure, the host cell may be a *Corynebacterium* sp. strain, for example, a *Corynebacterium glutamicum* strain.

Another aspect of the present disclosure provides a method for producing L-arginine or L-citrulline comprising steps of: culturing the *Corynebacterium glutamicum* mutant strain in a medium; and recovering L-arginine or L-citrulline from the cultured mutant strain or the medium in which the mutant strain has been cultured.

The culturing may be performed using a suitable medium and culture conditions known in the art, and any person skilled in the art may easily adjust and use the medium and the culture conditions. Specifically, the medium may be a liquid medium, but is not limited thereto. Examples of the culturing method include, but are not limited to, batch culture, continuous culture, fed-batch culture, or a combination thereof.

According to one embodiment of the present disclosure, the medium should meet the requirements of a specific strain in a proper manner, and may be appropriately modified by a person skilled in the art. For the culture medium for the *Corynebacterium* sp. microorganism or strain, reference may be made to, but not limited to, a known document (Manual of Methods for General Bacteriology, American Society for Bacteriology, Washington D.C., USA, 1981).

According to one embodiment of the present disclosurfe, the medium may contain various carbon sources, nitrogen sources, and trace element components. Examples of carbon sources that may be used include: saccharides and carbohydrates such as glucose, sucrose, lactose, fructose, maltose, starch, and cellulose; oils and fats such as soybean oil, sunflower oil, castor oil, and coconut oil; fatty acids such as palmitic acid, stearic acid, and linoleic acid; alcohols such as glycerol and ethanol; and organic acids such as acetic acid. These substances may be used individually or as a mixture, without being limited thereto. Examples of nitrogen sources that may be used include peptone, yeast extract, meat extract, malt extract, corn steep liquor, soybean meal, urea, or inorganic compounds such as ammonium sulfate, ammonium chloride, ammonium phosphate, ammonium carbonate, and ammonium nitrate. The nitrogen sources may also be used individually or as a mixture, without being limited thereto. Examples of phosphorus sources that may be used include, but are not limited to, potassium dihydrogen phosphate or dipotassium hydrogen phosphate or the corresponding sodium-containing salts. In addition, the culture medium may contain, but is not limited to, metal salts such as magnesium sulfate or iron sulfate, which are required for growth. In addition, the culture medium may contain essential growth substances such as amino acids and vitamins. Moreover, suitable precursors may be used in the culture medium. The medium or individual components may be added to the culture medium batchwise or in a continuous manner by a suitable method during culturing, without being limited thereto.

According to one embodiment of the present disclosure, the pH of the culture medium may be adjusted by adding compounds such as ammonium hydroxide, potassium hydroxide, ammonia, phosphoric acid and sulfuric acid to the microorganism culture medium in an appropriate manner during the culturing. In addition, during the culturing, foaming may be suppressed using an anti-foaming agent such as a fatty acid polyglycol ester. Additionally, to keep the culture medium in an aerobic condition, oxygen or an oxygen-containing gas (for example, air) may be injected into the culture medium. The temperature of the culture medium may be generally 20° C. to 45° C., for example, 25° C. to 40° C. The culturing may be continued until a desired amount of a useful substance is produced. For example, the culturing time may be 10 hours to 160 hours.

According to one embodiment of the present disclosure, in the step of recovering L-arginine or L-citrulline from the cultured mutant strain and the medium in which the mutant strain has been cultured, the produced L-arginine or L-citrulline may be collected or recovered from the medium using a suitable method known in the art depending on the culture method. Examples of the method for recovering L-arginine or L-citrulline that may be used include, but are not limited to, centrifugation, filtration, extraction, spraying, drying, evaporation, precipitation, crystallization, electrophoresis, fractional dissolution (e.g., ammonium sulfate precipitation), chromatography (e.g., ion exchange, affinity, hydrophobicity and size exclusion), and the like.

According to one embodiment of the present disclosure, the step of recovering L-arginine or L-citrulline may be performed by centrifuging the culture medium at a low speed to remove biomass and separating the obtained supernatant through ion-exchange chromatography.

According to one embodiment of the present disclosure, the step of recovering L-arginine or L-citrulline may include a process of purifying L-arginine or L-citrulline.

The *Corynebacterium* sp. mutant strain according to the present disclosure has enhanced activity of acetylornithine aminotransferase involved in the L-arginine biosynthesis pathway, and thus is capable of producing L-arginine or L-citrulline in an increased yield compared to the parent strain.

BRIEF DESCRIPTION OF THE DRAWINGS

The FIGURE shows the structure of a pk19msb+argD (A131T) vector containing a gene encoding an acetylornithine aminotransferase having a substitution of threonine for alanine at amino acid position 131 according to one embodiment of the present disclosure.

DETAILED DESCRIPTION

Hereinafter, the present disclosure will be described in more detail. However, these descriptions are provided for illustrative purposes only to aid in the understanding of the present disclosure, and the scope of the present disclosure is not limited by these illustrative descriptions.

Example 1. Construction of *Corynebacterium glutamicum* Mutant Strain

To construct a *Corynebacterium glutamicum* mutant strain having enhanced activity of acetylornithine aminotransferase, *Corynebacterium glutamicum* 14GR (KCCM13219P) strain, which is an L-arginine-producing strain, and *E. coli* DH5a (HIT Competent Cells™, Cat No. RH618) were used.

The *Corynebacterium glutamicum* 14GR strain was cultured in an ARG-broth medium (pH 7.2) containing 10.5 g of 98% glucose, 1 g of beef extract, 4 g of yeast extract, 2 g of polypeptone, 2 g of NaCl and 40 g of $(NH_4)_2SO_4$ in 1 L of distilled water at a temperature of 30° C.

The *E. coli* DH5a was cultured on an LB medium containing 10.0 g of tryptone, 10.0 g of NaCl and 5.0 g of yeast extract in 1 L of distilled water at a temperature of 37° C.

The antibiotic kanamycin used was the product of Sigma.

DNA sequencing was performed by Macrogen, Inc.

1-1. Recombinant Vector

Mutation was induced in acetylornithine aminotransferase to enhance the biosynthesis pathway in the strain. In the method used in this Example, the argD gene encoding acetylornithine aminotransferase was subjected to site-directed mutagenesis in order to increase expression of the gene. Alanine at amino acid position 131 of the acetylornithine aminotransferase encoded by the argD gene was substituted with threonine, and the left arm portion (529 bp) and the right arm portion (525 bp) with respect to the center of the argD gene on the *Corynebacterium glutamicum* genome were amplified by PCR and ligated together by overlap PCR, followed by cloning into a pk19msb vector. The resulting plasmid was named pk19msb+argD(A131T) (see the FIGURE). To construct the plasmid, the primers shown in Table 1 below were used for amplification of each gene fragment.

TABLE 1

| | Primer (5'→3') | | SEQ ID NO |
|---|---|---|---|
| Amplification primers for left homologous arm of argD | A131T-LF1 | tgattacgcccatcgcgcactcggtgttgc | 5 |
| | A131T-LF2 | catcgcgcactcggtgttgc | 6 |
| | A131T-LR1 | cgggaacgaccagtcaagcg | 7 |
| | A131T-LR2 | agtcagaatccgggaacgac | 8 |
| Amplification primers for right homologous arm of argD | A131T-RF1 | gattctgactgcagttcatggtttccacgg | 9 |
| | A131T-RF2 | gcagttcatggtttccacgg | 10 |
| | A131T-RR1 | gcgtcatcgacaacagacag | 11 |
| | A131T-RR2 | tgcgcagaaagcgtcatcga | 12 |

Using the above-described primers, PCR was performed under the following conditions. PCR was performed using a Thermocycler (TP600, TAKARA BIO Inc., Japan) in a reaction solution containing 100 μM of each deoxynucleotide triphosphate (dATP, dCTP, dGTP, dTTP), 1 pM oligonucleotide, ng of the chromosomal DNA of *Corynebacterium glutamicum* ATCC 13032 as a template, and 1 unit of pfu-X DNA polymerase mixture (Solgent). PCR was performed for 25 to 30 cycles, each consisting of (i) denaturation at 94° C. for 30 sec, (ii) annealing at 58° C. for 30 sec, and (iii) extension at 72° C. for 1 to 2 min (a polymerization time of 2 min per kb).

The gene fragments prepared as described above were cloned into a pk19msb vector by self-assembly cloning. The vector was transformed into *E. coli* DH5a which was then plated on an LB-agar plate containing 50 μg/ml of kanamycin, and cultured at 37° C. for 24 hours. The finally formed colony was isolated and whether the insert was exactly present in the vector was checked. Next, the vector was isolated and used for recombination of the *Corynebacterium glutamicum* strain.

As a process commonly performed in the above method, the corresponding genes were amplified by PCR from the genomic DNA of *Corynebacterium glutamicum* ATCC 13032 and inserted into the pk19msb vector by the self-assembled cloning method according to the strategy, and the resulting plasmid was selected in *E. coli* DH5a. For chromosomal base substitution, the gene fragments were amplified individually and ligated together by overlap PCR, thereby preparing the desired DNA fragment. For genetic manipulation, Ex Taq polymerase (Takara) and Pfu polymerase (Solgent) were used as PCR polymerases, and various restriction enzymes and DNA modifying enzymes purchased from NEB were used, and they were used according to manufacturer's provided buffers and protocols.

1-2. *Corynebacterium glutamicum* Mutant Strain AD1

Mutant strain AD1 was constructed using a cloning vector. The cloning vector was prepared at a final concentration of 1 μg/μl or more and electroporated into a *Corynebacterium glutamicum* 14GR strain (see Tauch et al., FEMS Microbiology letters 123 (1994) 343-347) to induce first recombination. In this case, the electroporated strain was plated on an agar medium containing 50 μg/μl of kanamycin, colonies were isolated, and whether the vector was properly inserted at the desired position on the genome was checked by PCR and sequencing. Each of the isolated strains was inoculated again in a liquid medium to induce second recombination, cultured overnight or more, and then plated on an agar medium containing 10% sucrose, and colonies were isolated. Whether the finally isolated colonies were resistant to kanamycin was checked, and then whether mutation was introduced into the acetylornithine aminotransferase in the strains having no antibiotic resistance was checked by sequencing (see Schafer et al., Gene 145 (1994) 69-73). As a result, *Corynebacterium glutamicum* mutant strain AD1 capable of producing L-arginine was constructed, which has a substitution of threonine for alanine at position 131 in the amino acid sequence of acetylornithine aminotransferase (SEQ ID NO: 2).

Experimental Example 1. Evaluation of L-Arginine Productivity of *Corynebacterium glutamicum* Mutant Strain The L-arginine productivity of the *Corynebacterium glutamicum* mutant strain AD1 constructed in Example 1 was evaluated in comparison with that of the parent strain.

Each strain was patched on a flask solid seed medium and cultured at 30° C. for 24 hours. Each cultured colony was inoculated into a 10-ml flask titer medium and cultured at 200 rpm at 32° C. for 30 hours. The compositions of the media used here are shown in Table 2 below. After completion of the culturing, each culture was diluted 100-fold with distilled water and filtered through a 0.45-μm filter, and then the amount of L-arginine produced was analyzed using high-performance liquid chromatography (HPLC) (Agilent Technologies 1260 Infinity, Agilent Technologies) equipped with a column (DionexIonPac™ CS12A) and a UV detector (195 mm), and the results are shown in Table 3 below. In Table 3, L-arginine (%) denotes the amount (percentage) of arginine produced by each strain, and fermentation yield (Yp/s) (%) denotes the amount of L-arginine produced per glucose consumed.

TABLE 2

| | |
|---|---|
| Flask solid seed medium (per L) | 10.5 g of 98% glucose, 1 g of beef extract, 4 g of yeast extract, 2 g of polypeptone, 2 g of NaCl, 40 g of $(NH_4)_2SO_4$ and 20 g of agar |
| Flask titer medium (per L) | 120 g of 98% glucose, 1 g of $MgSO_4$, 2 g of $KH_2PO_4$, 45 g of $(NH_4)_2SO_4$, 20 mg of $FeSO_4$, 20 mg of $MnSO_4$, 100 μg of biotin, 100 μg of thiamine, 4 g of YSP and 2 g of urea |

TABLE 3

| Strain | $OD_{610}$ | L-arginine (%) | Fermentation yield (%) |
|---|---|---|---|
| Parent strain | 18.0 | 1.63 | 16.31 |
| AD1 | 29.0 | 2.42 | 24.25 |

As shown in Table 3 above, it was confirmed that the *Corynebacterium glutamicum* mutant strain AD1 had significantly increased L-arginine productivity compared to the parent strain due to a substitution of threonine for alanine at amino acid position 131 in the amino acid sequence of acetylornithine aminotransferase.

Example 2. Construction of *Corynebacterium glutamicum* Mutant Strain

*Corynebacterium glutamicum* mutant strain CD1 having a substitution of threonine for alanine at position 131 in the amino acid sequence of acetylornithine aminotransferase (SEQ ID NO: 2) and capable of producing L-citrulline was constructed in the same manner as in Example 1, except that the pk19msb+argD(A131T) cloning vector of Example 1-1 was introduced into *Corynebacterium glutamicum* 15GD (KCCM13220P) in place of *Corynebacterium glutamicum* 14GR.

Experimental Example 2. Evaluation of L-Citrulline Productivity of *Corynebacterium glutamicum* Mutant Strain The L-citrulline productivity of the *Corynebacterium glutamicum* mutant strain CD1 constructed in Example 2 was evaluated in comparison with that of the parent strain.

Each strain was patched on a flask solid seed medium and cultured at 30° C. for 24 hours. Each cultured colony was inoculated into a 10-ml flask titer medium and cultured at 200 rpm at 32° C. for 30 hours. The compositions of the media used here are shown in Table 4 below. After completion of the culturing, each culture was diluted 100-fold with distilled water and filtered through a 0.45-μm filter, and then the amount of L-citrulline produced was analyzed using high-performance liquid chromatography (HPLC) (Agilent Technologies 1260 Infinity, Agilent Technologies) equipped with a column (DionexIonPac™ CS12A) and a UV detector (195 mm), and the results are shown in Table 5 below. In Table 5, L-citrulline (%) denotes the amount (percentage) of citrulline produced by each strain, and fermentation yield (Yp/s) (%) denotes the amount of L-citrulline produced per glucose consumed.

TABLE 4

| | |
|---|---|
| Flask solid seed medium (per L) | 10.5 g of 95% glucose, 10 g of beef extract, 10 g of yeast extract, 10 g of polypeptone, 2.5 g of NaCl and 100 mg of arginine |
| Flask titer medium (per L) | 105.3 g of 95% glucose, 1 g of $MgSO_4$, 4 g of YPA, 0.8 g of $KH_2PO_4$, 1.2 g of $Na_2HPO_4$, 30 g of $(NH_4)_2SO_4$, 20 mg of $FeSO_4$, 20 mg of $MnSO_4$, 10 mg of $ZnSO_4$, 100 mg of arginine, 100 μg of biotin and 200 μg of thiamine |

TABLE 5

| Strain | $OD_{610}$ | L-citrulline (%) | Fermentation yield (%) |
|---|---|---|---|
| Parent strain | 9.0 | 1.08 | 10.84 |
| CD1 | 14.0 | 1.53 | 15.33 |

As shown in Table 5 above, it was confirmed that the *Corynebacterium glutamicum* mutant strain CD1 had significantly increased L-citrulline productivity compared to the parent strain due to a substitution of threonine for alanine at amino acid position 131 in the amino acid sequence of acetylornithine aminotransferase.

These results suggest that L-arginine and L-citrulline productivities were increased by enhancing enzymatic activity through site-directed mutation in the nucleic acid sequence or amino acid sequence of acetylornithine aminotransferase involved in the L-arginine biosynthesis pathway.

So far, the present disclosure has been described with reference to the embodiments. Those of ordinary skill in the art to which the present disclosure pertains will appreciate that the present disclosure may be embodied in modified forms without departing from the essential characteristics of the present disclosure. Therefore, the disclosed embodiments should be considered from an illustrative point of view, not from a restrictive point of view. The scope of the present disclosure is defined by the claims rather than the foregoing description, and all differences within the scope equivalent thereto should be construed as being included in the present disclosure.

[Accession Number]
  Depository authority: Korean Culture Center of Microorganisms (KCCM)
  Accession number: KCCM13219P
  Deposit date: Jun. 29, 2022
  Depository authority: Korean Culture Center of Microorganisms (KCCM)
  Accession number: KCCM13220P
  Deposit date: Jun. 29, 2022

What is claimed is:

1. A *Corynebacterium* sp. mutant strain having increased L-arginine or L-citrulline productivity by having enhanced activity of acetylornithine aminotransferase, wherein said acetylornithine aminotransferase has a substitution of threonine for alanine at amino acid position 131 in the amino acid sequence of SEQ ID NO: 2.

2. The *Corynebacterium* sp. mutant strain of claim 1, which is *Corynebacterium glutamicum*.

3. A method for producing L-arginine or L-citrulline comprising steps of:
culturing the *Corynebacterium* sp. mutant strain of claim 1 in a medium; and
recovering L-arginine or L-citrulline from the cultured mutant strain or the medium in which the mutant strain has been cultured.

* * * * *

SEQUENCE LISTING

Sequence total quantity: 12
SEQ ID NO: 1          moltype = DNA   length = 1176
FEATURE               Location/Qualifiers

```
source                  1..1176
                        mol_type = genomic DNA
                        organism = Corynebacterium sp.
SEQUENCE: 1
atgagcacgc tggaaacttg gccacaggtc attattaata cgtacggcac cccaccagtt   60
gagctggtgt ccggcaaggg cgcaaccgtc actgatgacc agggcaatgt ctacatcgac  120
ttgctcgcgg gcatcgcagt caacgcgttg ggccacgccc accggcgat catcgaggcg   180
gtcaccaacc agatcggcca acttggtcac gtctcaaact tgttcgcatc caggcccgtc  240
gtcgaggtcg ccgaggagct catcaagcgt ttttcgcttg acgacgccac cctcgccgcg  300
caaacccggg ttttcttctg caactcgggc gccgaagcaa acgaggctgc tttcaagatt  360
gcacgcttga ctggtcgttc ccggattctg ctgcagttc atggtttcca cggccgcacc  420
atgggttccc tcgcgctgac tggccagcca gacaagcgtg aagcgttcct gccaatgcca  480
agcggtgtgg agttctaccc ttacggcgac accgattact gcgcaaaat ggtagaaacc   540
aacccaacgg atgtggctgc tatcttcctc gagccaatcc agggtgaaac gggcgttgtt  600
ccagcacctg aaggattcct caaggcagtg cgcgagctgt gcgatgagta cggcatcttg  660
atgatcaccg atgaagtcca gactggcgtt ggccgtaccg gcgatttctt tgcacatcag  720
cacgatggcg ttgttcccga tgtggtgacc atggccaagg gacttggcgg cggtcttccc  780
atcggtgctt gtttggccac tggccgtgca gctgaattga tgcccagg caagcacggc    840
accactttcg gtggcaaccc agttgcttgt gcagctgcca aggcagtgct gtctgttgtc  900
gatgacgctt tctgcgcaga agttgcccgc aagggcgagc tgttcaagga acttcttgcc  960
aaggttgacg gcgttgtaga cgtccgtggc aggggcttga tgttgggcgt ggtgctggag 1020
cgcgacgtcg caaagcaagc tgtcttgat ggttttaagc acgcgttat tttgaatgca   1080
ccggcggaca acattatccg tttgaccccg ccgctggtga tcaccgacga gaaatcgca   1140
gacgcagtca aggctattgc cgagacaatc gcataa                            1176

SEQ ID NO: 2             moltype = AA length = 391
FEATURE                  Location/Qualifiers
source                   1..391
                         mol_type = protein
                         organism = Corynebacterium sp.
SEQUENCE: 2
MSTLETWPQV IINTYGTPPV ELVSGKGATV TDDQGNVYID LLAGIAVNAL GHAHPAIIEA   60
VTNQIGQLGH VSNLFASRPV VEVAEELIKR FSLDDATLAA QTRVFFCNSG AEANEAAFKI  120
ARLTGRSRIL AAVHGFHGRT MGSLALTGQP DKREAFLPMP GVEFYPYGD TDYLRKMVET   180
NPTDVAAIFL EPIQGETGVV PAPEGFLKAV RELCDEYGIL MITDEVQTGV GRTGDFFAHQ  240
HDGVVPDVVT MAKGLGGGLP IGACLATGRA AELMTPGKHG TTFGGNPVAC AAAKAVLSVV  300
DDAFCAEVAR KGELFKELLA KVDGVVDVRG RGLMLGVVLE RDVAKQAVLD GFKHGVILNA  360
PADNIIRLTP PLVITDEEIA DAVKAIAETI A                                 391

SEQ ID NO: 3             moltype = DNA length = 1176
FEATURE                  Location/Qualifiers
source                   1..1176
                         mol_type = other DNA
                         organism = synthetic construct
SEQUENCE: 3
atgagcacgc tggaaacttg gccacaggtc attattaata cgtacggcac cccaccagtt   60
gagctggtgt ccggcaaggg cgcaaccgtc actgatgacc agggcaatgt ctacatcgac  120
ttgctcgcgg gcatcgcagt caacgcgttg ggccacgccc accggcgat catcgaggcg   180
gtcaccaacc agatcggcca acttggtcac gtctcaaact tgttcgcatc caggcccgtc  240
gtcgaggtcg ccgaggagct catcaagcgt ttttcgcttg acgacgccac cctcgccgcg  300
caaacccggg ttttcttctg caactcgggc gccgaagcaa acgaggctgc tttcaagatt  360
gcacgcttga ctggtcgttc ccggattctg actgcagttc atggtttcca cggccgcacc  420
atgggttccc tcgcgctgac tggccagcca gacaagcgtg aagcgttcct gccaatgcca  480
agcggtgtgg agttctaccc ttacggcgac accgattact gcgcaaaat ggtagaaacc   540
aacccaacgg atgtggctgc tatcttcctc gagccaatcc agggtgaaac gggcgttgtt  600
ccagcacctg aaggattcct caaggcagtg cgcgagctgt gcgatgagta cggcatcttg  660
atgatcaccg atgaagtcca gactggcgtt ggccgtaccg gcgatttctt tgcacatcag  720
cacgatggcg ttgttcccga tgtggtgacc atggccaagg gacttggcgg cggtcttccc  780
atcggtgctt gtttggccac tggccgtgca gctgaattga tgcccagg caagcacggc    840
accactttcg gtggcaaccc agttgcttgt gcagctgcca aggcagtgct gtctgttgtc  900
gatgacgctt tctgcgcaga agttgcccgc aagggcgagc tgttcaagga acttcttgcc  960
aaggttgacg gcgttgtaga cgtccgtggc aggggcttga tgttgggcgt ggtgctggag 1020
cgcgacgtcg caaagcaagc tgtcttgat ggttttaagc acgcgttat tttgaatgca   1080
ccggcggaca acattatccg tttgaccccg ccgctggtga tcaccgacga gaaatcgca   1140
gacgcagtca aggctattgc cgagacaatc gcataa                            1176

SEQ ID NO: 4             moltype = AA length = 391
FEATURE                  Location/Qualifiers
source                   1..391
                         mol_type = protein
                         organism = synthetic construct
SEQUENCE: 4
MSTLETWPQV IINTYGTPPV ELVSGKGATV TDDQGNVYID LLAGIAVNAL GHAHPAIIEA   60
VTNQIGQLGH VSNLFASRPV VEVAEELIKR FSLDDATLAA QTRVFFCNSG AEANEAAFKI  120
ARLTGRSRIL TAVHGFHGRT MGSLALTGQP DKREAFLPMP SGVEFYPYGD TDYLRKMVET  180
NPTDVAAIFL EPIQGETGVV PAPEGFLKAV RELCDEYGIL MITDEVQTGV GRTGDFFAHQ  240
HDGVVPDVVT MAKGLGGGLP IGACLATGRA AELMTPGKHG TTFGGNPVAC AAAKAVLSVV  300
DDAFCAEVAR KGELFKELLA KVDGVVDVRG RGLMLGVVLE RDVAKQAVLD GFKHGVILNA  360
PADNIIRLTP PLVITDEEIA DAVKAIAETI A                                 391
```

```
SEQ ID NO: 5            moltype = DNA  length = 30
FEATURE                 Location/Qualifiers
source                  1..30
                        mol_type = other DNA
                        organism = synthetic construct
SEQUENCE: 5
tgattacgcc catcgcgcac tcggtgttgc                                             30

SEQ ID NO: 6            moltype = DNA  length = 20
FEATURE                 Location/Qualifiers
source                  1..20
                        mol_type = other DNA
                        organism = synthetic construct
SEQUENCE: 6
catcgcgcac tcggtgttgc                                                        20

SEQ ID NO: 7            moltype = DNA  length = 20
FEATURE                 Location/Qualifiers
source                  1..20
                        mol_type = other DNA
                        organism = synthetic construct
SEQUENCE: 7
cgggaacgac cagtcaagcg                                                        20

SEQ ID NO: 8            moltype = DNA  length = 20
FEATURE                 Location/Qualifiers
source                  1..20
                        mol_type = other DNA
                        organism = synthetic construct
SEQUENCE: 8
agtcagaatc cgggaacgac                                                        20

SEQ ID NO: 9            moltype = DNA  length = 30
FEATURE                 Location/Qualifiers
source                  1..30
                        mol_type = other DNA
                        organism = synthetic construct
SEQUENCE: 9
gattctgact gcagttcatg gtttccacgg                                             30

SEQ ID NO: 10           moltype = DNA  length = 20
FEATURE                 Location/Qualifiers
source                  1..20
                        mol_type = other DNA
                        organism = synthetic construct
SEQUENCE: 10
gcagttcatg gtttccacgg                                                        20

SEQ ID NO: 11           moltype = DNA  length = 20
FEATURE                 Location/Qualifiers
source                  1..20
                        mol_type = other DNA
                        organism = synthetic construct
SEQUENCE: 11
gcgtcatcga caacagacag                                                        20

SEQ ID NO: 12           moltype = DNA  length = 20
FEATURE                 Location/Qualifiers
source                  1..20
                        mol_type = other DNA
                        organism = synthetic construct
SEQUENCE: 12
tgcgcagaaa gcgtcatcga                                                        20
```